United States Patent
Ozawa

(10) Patent No.: US 10,113,583 B2
(45) Date of Patent: Oct. 30, 2018

(54) ROLLING BEARING AND ANTI-ROTATION MECHANISM FOR TURBOCHARGER

(71) Applicant: MINEBEA MITSUMI Inc., Nagano (JP)

(72) Inventor: Kazuhito Ozawa, Kitasaku (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 15/673,550

(22) Filed: Aug. 10, 2017

(65) Prior Publication Data

US 2018/0045242 A1    Feb. 15, 2018

(30) Foreign Application Priority Data

Aug. 12, 2016 (JP) ................. 2016-159040

(51) Int. Cl.
| | |
|---|---|
| F16C 33/60 | (2006.01) |
| F16C 19/18 | (2006.01) |
| F01D 25/16 | (2006.01) |
| F16C 33/58 | (2006.01) |
| F01D 25/18 | (2006.01) |
| F16C 33/66 | (2006.01) |
| F16C 37/00 | (2006.01) |

(52) U.S. Cl.
CPC ............ *F16C 19/184* (2013.01); *F01D 25/16* (2013.01); *F01D 25/162* (2013.01); *F01D 25/18* (2013.01); *F16C 33/58* (2013.01); *F16C 33/586* (2013.01); *F16C 33/6659* (2013.01); *F16C 37/007* (2013.01); *F05D 2220/40* (2013.01); *F05D 2240/54* (2013.01); *F16C 2360/24* (2013.01)

(58) Field of Classification Search
CPC ....... F16C 19/194; F16C 33/60; F16C 35/077; F16C 2360/24; F01D 25/162
See application file for complete search history.

(56) References Cited

U.S. PATENT DOCUMENTS

| | | | |
|---|---|---|---|
| 8,961,128 B2 | 2/2015 | Mavorsakis et al. | |
| 2005/0287018 A1* | 12/2005 | Mavrosakis | F01D 25/16 417/407 |
| 2011/0052388 A1* | 3/2011 | Mavrosakis | F01D 25/162 415/229 |
| 2013/0259416 A1* | 10/2013 | Schmidt | F16C 19/184 384/490 |
| 2015/0198084 A1* | 7/2015 | Daimer | F02B 47/08 415/62 |

* cited by examiner

Primary Examiner — Phillip A Johnson
(74) Attorney, Agent, or Firm — Pearne & Gordon LLP

(57) ABSTRACT

A rolling bearing for a turbocharger according to an embodiment includes an outer ring, a first inner ring, a second inner ring, a plurality of rolling elements, a first retainer and a second retainer. The outer ring has a cylindrical shape and has two outer ring raceway surfaces. The first inner ring has a first inner ring raceway surface. The second inner ring has a second inner ring raceway surface. The first retainer holds a plurality of rolling elements. The second retainer holds a plurality of rolling elements. The outer peripheral surface at one end of the outer ring has a first plane extending in the axial direction, and a groove is formed from the first plane along a radial direction perpendicular to the first plane.

3 Claims, 4 Drawing Sheets

ROLLING BEARING AND ANTI-ROTATION MECHANISM FOR TURBOCHARGER

CROSS-REFERENCE TO RELATED APPLICATION(S)

The present application claims priority to and incorporates by reference the entire contents of Japanese Patent Application No. 2016-159040 filed in Japan on Aug. 12, 2016.

BACKGROUND OF THE INVENTION

1. Field of the Invention

The present invention relates to a rolling bearing for a turbocharger and an anti-rotation mechanism for a turbocharger.

2. Description of the Related Art

An oil film of about several tens of micrometers, for example, is present between an outer ring of a rolling bearing for a turbocharger and a housing that holds the rolling bearing for the turbocharger. Consequently, the outer ring may be rotated or the position of the outer ring may be shifted, due to the frictional force from an inner ring that rotates at a high speed. Thus, the outer ring is sometimes provided with an anti-rotation mechanism. As a conventional anti-rotation mechanism for an outer ring of a bearing, a method of forming a slit groove on the outer periphery of the outer ring, and inserting a member that fits into the slit groove has been known (U.S. Pat. No. 8,961,128, for example).

However, in the conventional anti-rotation method, the movement of the bearing in the up-and-down direction (vertical direction) and the movement of the bearing in the left-and-right direction (direction perpendicular to the axis and in the horizontal direction) when viewed from the front, may not be suppressed at the same time. As a result, the bearing may generate vibration and may become unstable during an operation. Moreover, when the slit groove is formed on the outer periphery of the outer ring, a grinding stone may be damaged during a grinding process of the outer ring.

SUMMARY OF THE INVENTION

It is an object of the present invention to at least partially solve the problems in the conventional technology.

A rolling bearing for a turbocharger according to an embodiment includes an outer ring, a first inner ring, a second inner ring, a first inner ring, a second inner ring, a first retainer and a second retainer. The outer ring has a cylindrical shape and has an outer ring raceway surface at one end side and an outer ring raceway surface at another end side, the outer ring raceway surfaces being separately formed on an inner peripheral surface in an axial direction. The first inner ring has a first inner ring raceway surface facing the outer ring raceway surface at the one end side. The second inner ring has a second inner ring raceway surface facing the outer ring raceway surface at the other end side. The first retainer holds a plurality of rolling elements disposed between the outer ring raceway surface at the one end side and the first inner ring raceway surface. The second retainer holds a plurality of rolling elements disposed between the outer ring raceway surface at the other end side and the second inner ring raceway surface. An outer peripheral surface at one end of the outer ring has a first plane extending in the axial direction, and a groove is formed from the first plane along a radial direction perpendicular to the first plane.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a rolling bearing and an anti-rotation mechanism for a turbocharger according to an embodiment will be described in detail with reference to the accompanying drawings. In the following, the rolling bearing for the turbocharger may simply be referred to as a rolling bearing, to avoid redundancy.

Embodiment

Figure 1:
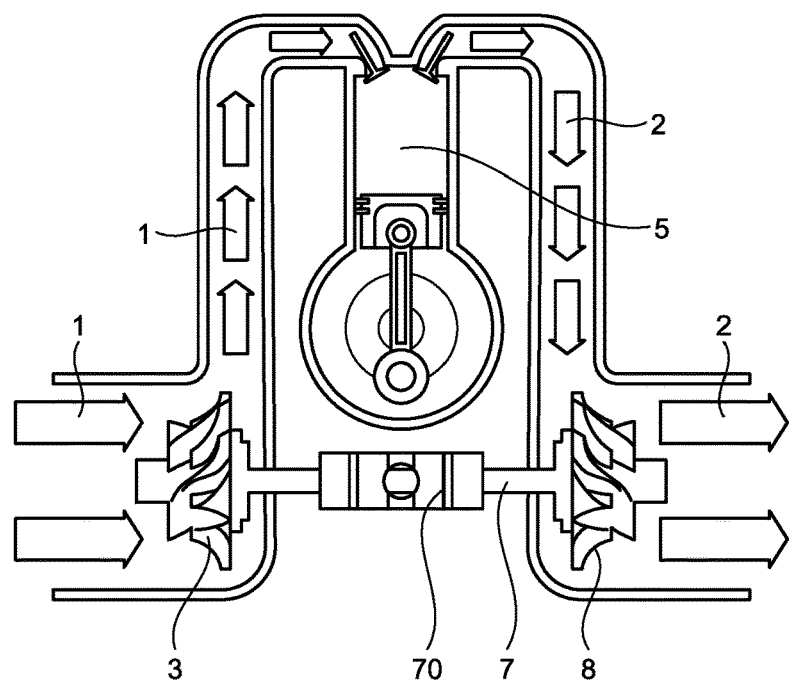
FIG. 1 is a diagram illustrating an overview of a turbocharger provided with a rolling bearing for a turbocharger.

FIG. 1 is a diagram illustrating an overview of a general turbocharger for a vehicle provided with a rolling bearing for a turbocharger. In FIG. 1, arrows 1 indicate the flow of air entering the turbocharger from the outside. In FIG. 1, the right end of a rotation shaft 7 is provided with a turbine 8 that is rotated at a high speed by exhaust gas discharged from a cylinder 5 of an engine that is indicated by arrows 2. In FIG. 1, the left end of the rotation shaft 7 is provided with a compressor 3. The arrows 2 indicate the flow of exhaust gas discharged from the cylinder 5 after combustion. A rolling bearing 70 for the turbocharger is a double row rolling bearing that rotatably supports the rotation shaft 7. In FIG. 1, illustration of a housing that supports the rolling bearing 70 is omitted.

The turbocharger compresses the air flowing into the turbocharger and improves the combustion efficiency of the engine. As illustrated by the arrows 2, the turbine 8 rotates at a high speed due to the exhaust gas discharged from the cylinder 5 of the engine. The rotation of the turbine 8 rotates the compressor 3 that is coaxial to the turbine 8 at the same rotation speed via the rotation shaft 7. As illustrated by the arrows 1, the air flowing into the turbocharger is compressed by the compressor 3, and sent to the cylinder 5 of the engine with an increased density. Consequently, an air discharge amount per unit time increases, thereby increasing the combustion efficiency.

Figure 2:
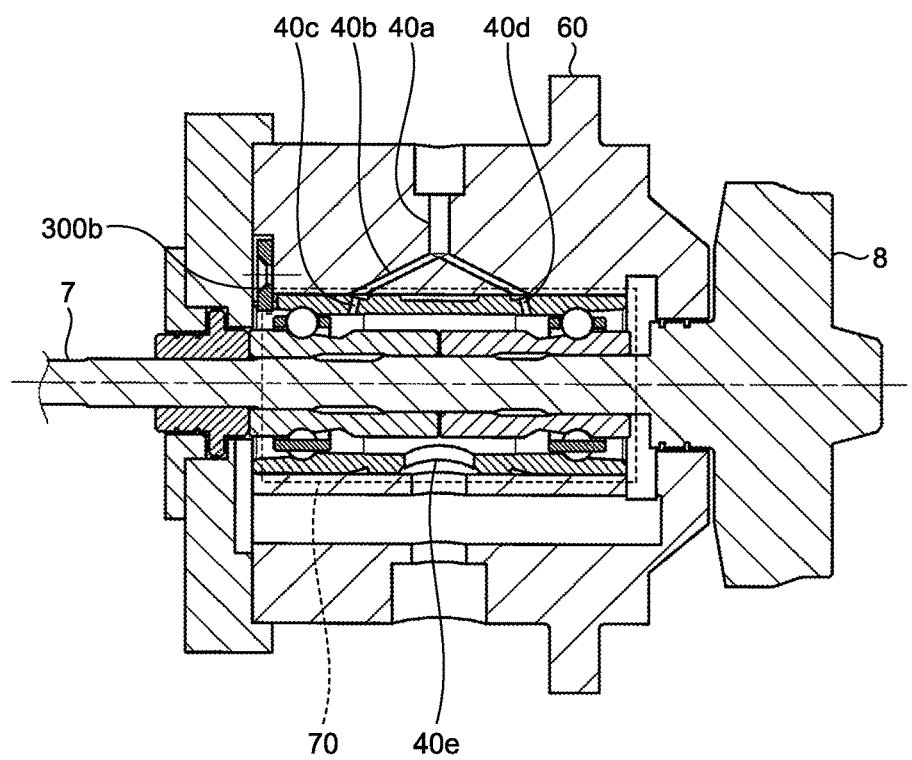
FIG. 2 is a diagram illustrating an overview when a rolling bearing for a turbocharger according to an embodiment is incorporated into a housing.

FIG. 2 is a diagram illustrating an overview when a rolling bearing for a turbocharger according to the embodiment is incorporated into a housing. A housing 60 has a through hole and supports the rolling bearing 70 for the turbocharger that is inserted into the through hole. Details of the rolling bearing 70 will be described in FIG. 3. The rotation shaft 7 is a rotation shaft rotatably supported by the rolling bearing 70. The turbine 8 is a blade fixed to the rotation shaft 7. The turbine 8 is disposed on the end of the rotation shaft 7 at the side (air discharge side) from which gas that has passed through the cylinder 5 and that is combusted is discharged. Although not illustrated in FIG. 2, the compressor 3 that rotates at the air intake side into which air flows is provided at the left end of the rotation shaft 7 in FIG. 2.

A lubricant inlet port 40a is an inlet port for lubricant filling the rolling bearing 70. For example, the lubricant inlet port 40a is provided at the upper side of the housing 60. A lubricant inlet path 40b is a path that connects the lubricant inlet port 40a provided at the upper side of the housing 60 and the outer peripheral surface of the bearing outer ring. The lubricant is used to reduce friction and abrasion of the rolling bearing 70, cool the rolling bearing 70 by discharging heat, prevent foreign matters from entering the rolling bearing 70, and the like. For example, mineral oil such as spindle oil, machine oil, and turbine oil is commonly used as the lubricant for the rolling bearing. However, when operational conditions are such that temperature is increased to 150 degrees Celsius or more, or reduced to minus 30 degrees Celsius or less, synthetic oil such as diester oil, silicone oil, fluorocarbon oil may also be used. Lubricant inlet holes 40c and 40d are through holes provided on the outer ring of the rolling bearing 70 for allowing the lubricant to flow in. The inside of the rolling bearing 70 is filled with lubricant through the through holes. A lubricant outlet port 40e is an outlet port from which the lubricant in the rolling bearing 70 is discharged. For example, the lubricant outlet port 40e is provided opposite from the lubricant inlet holes 40c and 40d that are provided on the outer ring of the rolling bearing 70. An anti-rotation member 300b is a member having a shape capable of being fitted into a groove provided on the outer ring of the rolling bearing 70. The anti-rotation member 300b prevents the outer ring of the rolling bearing 70 from rotating and also prevents the outer ring from shifting in the axial direction.

Figure 3:
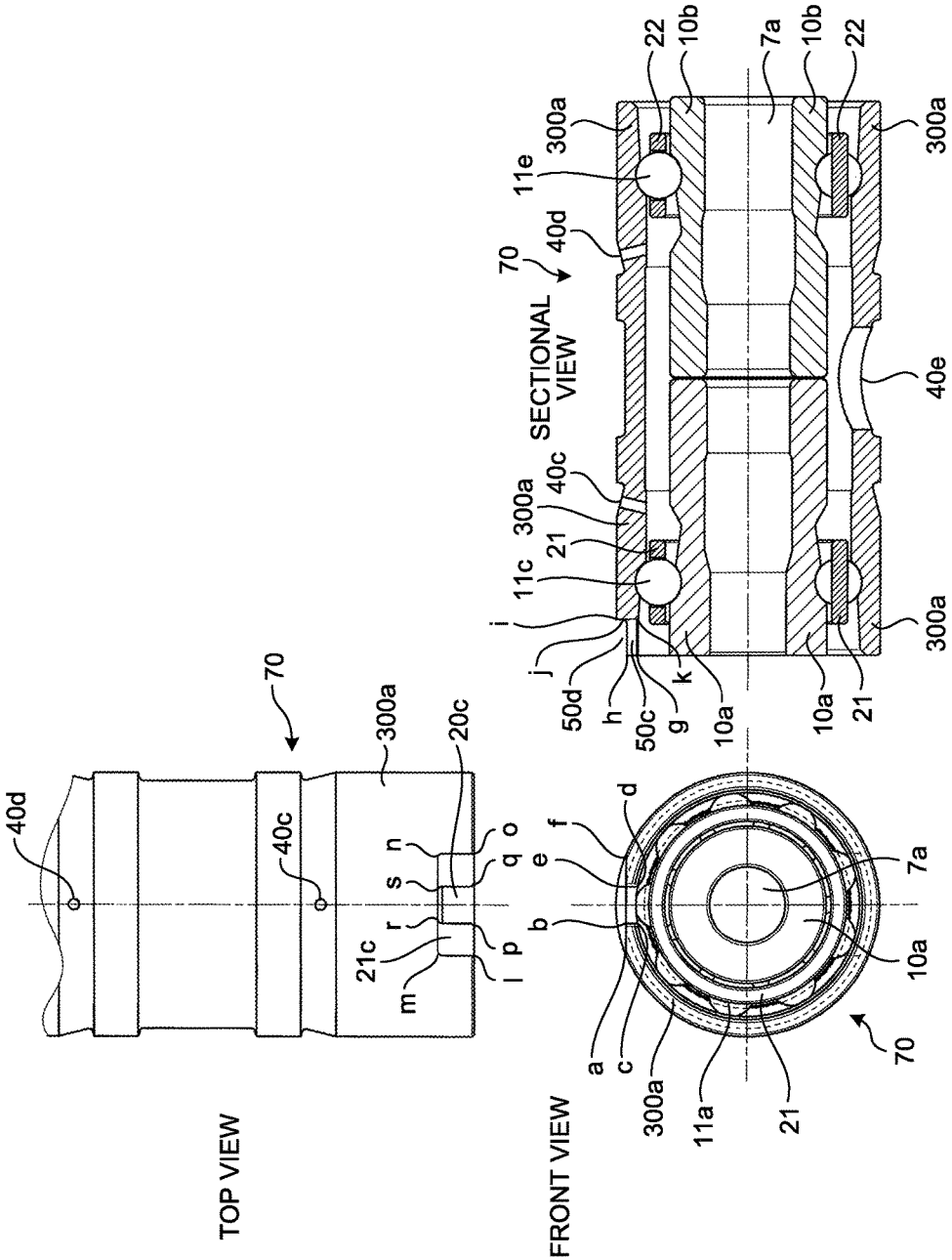
FIG. 3 is a three-view drawing illustrating the details of the rolling bearing for the turbocharger according to the embodiment.

Next, the configuration of the rolling bearing 70 for the turbocharger will be described in more detail with reference to FIG. 3. FIG. 3 is a three-view drawing illustrating the details of the rolling bearing 70 according to the embodiment. The lower left view in FIG. 3 is a front view of the rolling bearing 70. The upper left view in FIG. 3 is a top view of the rolling bearing 70. The lower right view in FIG. 3 is a sectional view of the rolling bearing 70.

In the sectional view, a shaft insertion part 7a is a portion where the rotation shaft 7 (shaft) is inserted, and consists of a through hole that extends from one end side to the other end side so that the shaft can be inserted.

An inner ring 10a and an inner ring 10b are the inner rings of the rolling bearing 70. The inner ring 10a and the inner ring 10b each have an inner ring raceway surface on the outer peripheral surface. The inner ring 10a and the inner ring 10b are fixed to the rotation shaft 7 (shaft) inserted into the shaft insertion part 7a, and rotate with the rotation of the rotation shaft 7. The inner ring 10a and the inner ring 10b both have a hollow cylindrical shape.

An outer ring 300a is the outer ring of the rolling bearing 70. The outer ring 300a is fitted to the housing 60, and is supported by the housing 60. The outer ring 300a is a single cylindrical member having an outer peripheral surface and an inner peripheral surface. The outer ring 300a has outer ring raceway surfaces that are separately disposed on one end side and the other end side of the inner peripheral surface in the axial direction. The outer ring raceway surfaces face the two inner ring raceway surfaces described above to form a double row raceway.

Rolling elements 11c are rolling elements disposed in the raceway at one end side that is provided between the inner ring 10a and the outer ring 300a. For example, the rolling elements are made from a wire material such as steel, and have a spherical shape. Consequently, the rolling elements 11c come into point contact with the raceway surfaces of the inner ring 10a and the outer ring 300a. Similarly, rolling elements 11e are rolling elements disposed in the raceway at the other end side that is provided between the inner ring 10b and the outer ring 300a, and come into point contact with the inner ring 10b and the outer ring 300a. In this manner, the outer ring 300a can support the load from the inner rings 10a and 10b, in other words, the load from the rotation shaft 7 via the rolling elements 11c and 11e. Moreover, as the rolling elements 11c and 11e are in point contact with the inner rings 10a and 10b as well as the outer ring 300a, even if the rotation shaft 7 rotates at a high speed, the friction generated between the inner ring 10a and the outer ring 300a as well as between the inner ring 10b and the outer ring 300a is small. In this manner, the rolling bearing 70 can rotatably support the rotation shaft 7 while supporting the load from the rotation shaft 7.

In general, an angular bearing is selected for the rolling bearing 70 for the turbocharger, to support the load from the rotation shaft 7 not only in the axial direction but also in the thrust direction.

Retainers 21 and 22 are members for respectively holding the rolling elements 11c and the rolling elements 11e at equal intervals. The retainer 21 is provided between the inner ring 10a and the outer ring 300a, and holds a plurality of rolling elements 11c.

Similarly, the retainer 22 is provided between the inner ring 10b and the outer ring 300a, and holds a plurality of rolling elements 11e.

For example, the type of retainer includes a machined (cut out) retainer that is formed by cutting a material such as steel and copper alloy, a punching (pressed) retainer that is formed by punching a material such as a steel plate with a die, a molded (resin) retainer that is formed by pouring resin into a mold, and the like. The machined retainer is used in the present embodiment.

The lubricant inlet holes 40c, 40d and the lubricant outlet port 40e in FIG. 3 respectively correspond to the lubricant inlet holes 40c, 40d and the lubricant outlet port 40e in FIG. 2. The lubricant that flows into the rolling bearing 70 through the lubricant inlet hole 40c fills the rolling bearing 70 while passing between the inner ring 10a and the outer ring 300a, and is discharged from the lubricant outlet port 40e. The lubricant is used to reduce friction and cool the rolling bearing 70.

Figure 4:
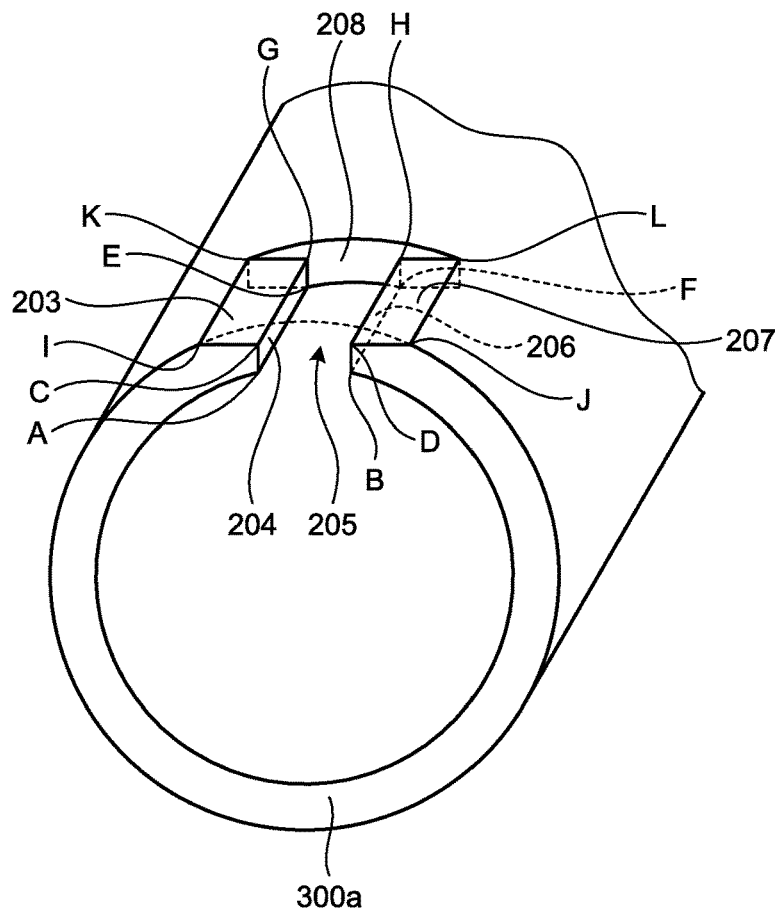
FIG. 4 is an explanatory diagram of a configuration of an outer ring of the rolling bearing for the turbocharger according to the embodiment.
Figure 5:
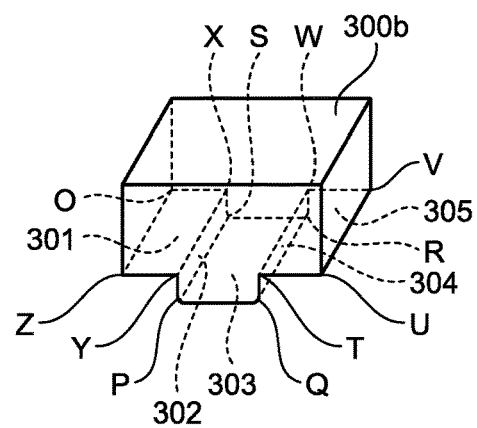
FIG. 5 is an explanatory diagram of a configuration of an anti-rotation member that is fitted to the outer ring of the rolling bearing according to the embodiment.
Figure 6:
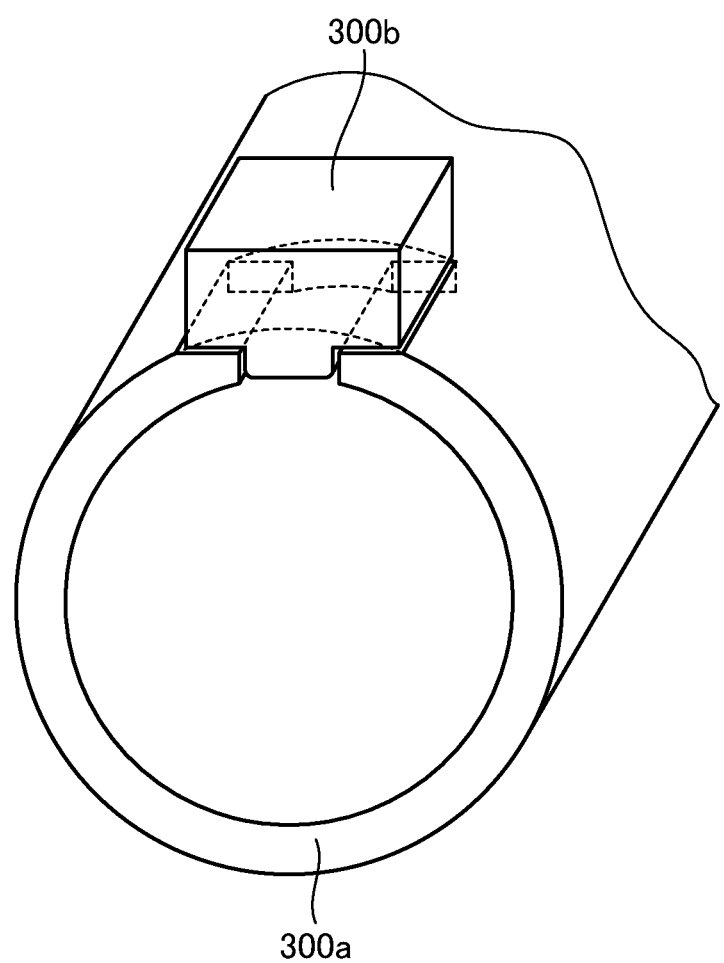
FIG. 6 is a diagram illustrating a state when the anti-rotation member is fitted to the outer ring, in the embodiment.

Next, a sectional shape of the outer ring 300a will be described. The outer peripheral surface at one end of the outer ring 300a has a first plane that extends in the axial direction. A groove is formed from the first plane along the radial direction perpendicular to the first plane. The first plane is a plane perpendicular to the radial direction, and passes between the outer diameter of the outer ring 300a and the inner diameter of the outer ring 300a. The sectional shape of the outer ring 300a will be described with reference to FIG. 4 to FIG. 6. FIG. 4 is an explanatory diagram of a configuration of the outer ring of the rolling bearing according to the embodiment. FIG. 5 is an explanatory diagram of a configuration of a member fitted to the outer ring of the rolling bearing according to the embodiment. FIG. 6 is an explanatory diagram of engagement between the outer ring and the member in the embodiment.

In FIG. 4, apexes A, B, C, D, E, F, G, H, I, J, K, and L are apexes of the outer ring 300a having been cut.

A surface 203 is the surface having the apex I, the apex C, the apex G, and the apex K. Two sides of the surface 203 (the side connecting the apex C and the apex I, and the side connecting the apex G and the apex K) extend in a horizontal direction (first direction) that is perpendicular to the vertical direction. The other two sides of the surface 203 (the side connecting the apex C and the apex G, and the side connecting the apex K and the apex I) extend in the axial direction of the outer ring 300a.

Similarly, a surface 207 is the surface having the apex D, the apex J, the apex L, and the apex H. The surface 203 and the surface 207 belong to the same plane. Two sides (the side connecting the apex D and the apex J, and the side connecting the apex L and the apex H) of the surface 207 extend in the horizontal direction that is perpendicular to the vertical direction (first direction). In addition, the other two sides of the surface 207 (the side connecting the apex D and the apex H, and the side connecting the apex J and the apex L) extend, for example, in the axial direction of the outer ring 300a. For example, the surface 203 and the surface 207 are planar surfaces. In such a case, for example, the surface 203 and the surface 207 both have a rectangular shape.

A surface 204 is a surface having the apex C, the apex A, the apex E, and the apex G. For example, two sides of the surface 204 (the side connecting the apex C and the apex A, and the side connecting the apex E and the apex G) extend in the vertical direction (second direction). For example, the other two sides of the surface 204 (the side connecting the apex C and the apex G, and the side connecting the apex A and the apex E) extend in the axial direction of the outer ring 300a. One of the sides (the side connecting the apex C and the apex G) is common to the surface 203 and the surface 204. One of the sides of the surface 203 (for example, the side connecting the apex I and the apex C), and one of the sides of the surface 204 (for example, the side connecting the apex C and the apex A) are perpendicular to each other. Similarly, a surface 206 is the surface having the apex D, the apex B, the apex F, and the apex H. For example, two sides of the surface 206 (the side connecting the apex D and the apex B, and the side connecting the apex F and the apex H) extend in the vertical direction (second direction). For example, the other two sides of the surface 206 (the side connecting the apex D and the apex H, and the side connecting the apex B and the apex F) extend in the axial direction of the outer ring 300a. One of the sides (the side connecting the apex D and the apex H) is common to the surface 206 and the surface 207. One of the sides of the surface 207 (for example, the side connecting the apex D and the apex J) and one of the sides of the surface 206 (for example, the side connecting the apex D and the apex B) are perpendicular to each other.

A groove 205 is a groove formed from the first plane that is the plane passing through the surface 203 and the surface 207, along the radial direction perpendicular to the first plane. A surface 208 is the surface having the apex K, the apex G, the apex E, the apex F, the apex H, and the apex L. For example, a line connecting the apex K and the apex L is a circular arc. The surface 208 extends in the horizontal direction (first direction) that is perpendicular to the vertical direction, as well as in the vertical direction (second direction). The surface 208 and the surface 203 have one common side (the side connecting the apex K and the apex G). The surface 208 and the surface 204 have one common side (the side connecting the apex G and the apex E). The surface 208 and the surface 206 have one common side (the side connecting the apex H and the apex F). The surface 208 and the surface 207 have one common side (the side connecting the apex H and the apex L). For example, the surface 208 is perpendicular to a line connecting the apex K and the apex I, a line connecting the apex G and the apex C, a line connecting the apex E and the apex A, a line connecting the apex H and the apex D, a line connecting the apex F and the apex B, and a line connecting the apex L and the apex J.

When FIG. 4 is compared with FIG. 3, in the front view of FIG. 3, the position a is the position corresponding to the apex I and the apex K in FIG. 4. The position b is the position corresponding to the apex C and the apex G. The position c is the position corresponding to the apex A and the apex G. The position d is the position corresponding to the apex B and the apex F. The position e is the position corresponding to the apex D and the apex H. The position f is the position corresponding to the apex J and the apex L. In the sectional view of FIG. 3, the position g is the position corresponding to the apex B and the apex A. The position h is the position corresponding to the apex J, the apex D, the apex C, and the apex I. The position i is the position corresponding to the apex position of the arc connecting the apex K and the apex L. The position j is the position corresponding to the apex L, the apex H, the apex G, and the apex K. The position k is the position corresponding to the apex F and the apex E. In a plan view 100b in FIG. 3, the position 1 is the position corresponding to the apex I. The position m is the position corresponding to the apex K. The position n is the position corresponding to the apex L. The position o is the position corresponding to the apex J. The position p is the position corresponding to the apex C and the apex A. The position q is the position corresponding to the apex B and the apex D. The position r is the position corresponding to the apex G and the apex E. The position s is the position corresponding to the apex H and the apex F.

In this manner, as illustrated in FIG. 4, the outer peripheral surface at one of the ends of the outer ring 300a has the first plane extending in the axial direction, and the groove 205 is formed on the first plane. In other words, the cylindrical outer peripheral surface is cut off by the first plane, and the groove 205 is formed on the first plane that is the cut surface. In this example, one of the ends of the outer ring 300a is for example the front side area of FIG. 4. Therefore, the outer peripheral surface at one of the ends is an area where the apexes A to L are located. The first plane that extends in the axial direction is the surface defined by the surface 203, the surface 207, and the apex G, the apex C, the apex D and the apex H. In other words, the first plane is the plane that extends in the axial direction on condition that the plane passes between the outer diameter of the outer ring 300a and the inner diameter of the outer ring 300a, without intersecting the inner diameter of the outer ring 300a. In addition, the groove 205 formed on the first plane is for example a parallelepiped area that is obtained by connecting the apex K, the apex E, the apex C, the apex A, the apex H, the apex F, the apex D, and the apex B.

The groove 205 formed on the first plane is formed so as to passing through the outer ring from the outer peripheral surface to the inner peripheral surface.

It is preferable that the length of the cut area that is cut by the first plane (flat surface) and the groove 205 (slit groove) that is formed on the first plane in the axial direction is selected so as not to reach the center of the outer ring raceway groove curvature, for example. It is also preferable that the center of the flat surface and the slit groove are on the same outer diameter radius so that the flat surface and the slit groove are symmetric in relation to this outer diameter radius, when viewed from the front of the bearing. It is also preferable that the width of sectional surface of the slit groove in the radial direction is at least about 1 mm.

The temperature of the compressor at the side into which the air flows (air intake side) will not increase as much as the temperature of the turbine at the side from which the exhaust gas from the cylinder of the engine is discharged (air discharge side). Consequently, it is preferable that one of the ends of the outer ring 300a is the end at the air intake side. In other words, one of the ends of the outer ring 300a is the end disposed at the compressor side of the turbocharger.

An anti-rotation member 300b to be fitted to the outer ring 300a illustrated in FIG. 4 will now be described with reference to FIG. 5. FIG. 5 is an explanatory diagram of a configuration of an anti-rotation member to be fitted to the outer ring 300a of the rolling bearing according to the embodiment.

The anti-rotation member 300b is an anti-rotation member fitted to the outer ring 300a. The anti-rotation member 300b corresponds to the anti-rotation member 300b illustrated in FIG. 2. The anti-rotation member 300b includes apexes O, P, Q, R, S, T, U, V, W, X, Y, and Z.

A surface 301 is the surface having the apex O, the apex Z, the apex Y, and the apex X. A surface 302 is the surface having the apex Y, the apex P, the apex S, and the apex X. A surface 303 is the surface having the apex P, the apex Q, the apex W, and the apex S. A surface 304 is the surface having the apex Q, the apex R, the apex V and the apex T. A surface 305 is the surface having the apex T, the apex U, the apex V, and the apex W. The surface 301 and the surface 302 share one of the sides, and so do the surface 302 and the surface 303, the surface 303 and the surface 304, as well as the surface 304 and the surface 305. The surface 301 and the surface 302 are perpendicular to each other. The surface 302 and the surface 303 are perpendicular to each other. The surface 303 and the surface 304 are perpendicular to each other. The surface 304 and the surface 305 are perpendicular to each other. The surface 301, the surface 303, and the surface 305 are parallel to one another, and the surface 301 and the surface 305 are provided on the same surface. The surface 302 and the surface 304 are parallel to each other.

For example, to prevent friction, areas close to the apex P, the apex Q, the apex S, and the apex W may have a round shape.

Next, engagement between the outer ring 300a and the anti-rotation member 300b will be described with reference to FIG. 6. FIG. 6 is an explanatory diagram of engagement between the outer ring and the member, in the embodiment. As illustrated in FIG. 6, the outer ring 300a in FIG. 4 and the anti-rotation member 300b in FIG. 5 are fitted to each other. When the outer ring 300a and the anti-rotation member 300b are fitted to each other, the surface 203 in FIG. 4 comes into contact with the surface 301 in FIG. 5, and the surface 207 in FIG. 4 comes into contact with the surface 305 in FIG. 5. The surface 204 in FIG. 4 may come into contact with the surface 302 in FIG. 5, and the surface 206 in FIG. 4 may come into contact with the surface 304 in FIG. 5.

In other words, the anti-rotation member 300b includes a solid body having the second plane and a protrusion brought into contact with the second plane. The second plane contacts the first plane, and the protrusion is to be fitted into the groove 205. In other words, the anti-rotation member 300b includes the second plane to contact the first plane and the protrusion to be fitted into the groove 205. The housing 60 supports the rolling bearing 70 by the anti-rotation member 300b. In other words, the anti-rotation member 300b is fixed to the housing in a manner that the second plane comes into contact with the first plane and the protrusion is fitted into the groove 205. In this example, the second plane to contact the first plane is a plane determined by the surface 301, the surface 305, and the apex Y, the apex T, the apex W and the apex X, for example. The solid body including the second plane is the solid body at the upper side of the second plane in the drawing of FIG. 5. The protrusion contacting the second plane is for example a hexahedron determined by the apex Y, the apex P, the apex Q, the apex T, the apex W, the apex R, the apex X, and the apex S. In this case, the second plane in FIG. 5 comes into contact with the first plane in FIG. 4 and the protrusion in FIG. 5 is fitted into the groove 205 in FIG. 4.

Next, effects generated by using the rolling bearing and the anti-rotation mechanism according to the embodiment will be described. The outer ring 300a illustrated in FIG. 4 includes the groove 205. Thus, when the outer ring 300a and the anti-rotation member 300b are fitted to each other, the anti-rotation member 300b prevents the outer ring 300a from rotating, and consequently prevents the outer ring 300a from rotating together with the rotation shaft. Similarly, the outer ring 300a and the anti-rotation member 300b are prevented from moving in the left-and-right direction in the drawings of FIG. 4 and FIG. 5. Consequently, vibration will be reduced. The outer ring 300a illustrated in FIG. 4 includes cut surfaces such as the surface 203 and the surface 207, as well as surfaces such as the surface 204 and the surface 206, in addition to the groove 205. Thus, when the outer ring 300a and the anti-rotation member 300b illustrated in FIG. 5 are fitted to each other, the contact area between the outer ring 300a and the anti-rotation member 300b is increased. As a result, the outer ring 300a and the anti-rotation member 300b are prevented from moving in the up-and-down direction in the drawings of FIG. 4 and FIG. 5, due to the frictional force between the outer ring 300a and the anti-rotation member 300b. In addition, the outer ring 300a and the anti-rotation member 300b are prevented from moving in the front-to-rear direction in the drawings of FIG. 4 and FIG. 5. Hence, the rolling bearing and the anti-rotation mechanism according to the embodiment have an excellent anti-rotation function as well as an excellent vibration reduction function.

In addition, in general, the outer ring 300a requires high circularity. To improve the circularity of the outer ring 300a, a grinding process is performed on the outer ring 300a. However, in the conventional outer ring, when the slit groove (groove 205) is formed on the outer ring, the grinding stone comes into contact with the edge of the slit groove, and may damage the grinding stone or the edge of the slit groove. However, with the rolling bearing according to the embodiment, the edges of the slit groove (groove 205) of the outer ring 300a defined by the points such as the apex C, the apex D, the apex G and the apex H are inside of the outer peripheral circle of the outer ring. Thus, the edge of the slit groove and the grinding stone are less likely to be damaged during the grinding process.

The shape of the groove 205 is not limited to that illustrated in FIG. 4, and for example, the groove 205 may be provided at a plurality of locations on the outer periphery. The surface 203 and the surface 207 need not be coplanar. The surface 203 and the surface 204, as well as the surface 206 and the surface 207 need not be perpendicular to each other. Each of the surfaces 203 to 207 need not be a planar surface, and for example, may be a curved surface. The apex portions of the outer ring 300*a* and the anti-rotation member 300*b* may also have a substantially rounded shape.

The rolling bearing for the turbocharger according to an embodiment of the present invention has an excellent anti-rotation function, and the grinding stone is less likely to be damaged during the grinding process of the outer ring.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rolling bearing for a turbocharger, the rolling bearing comprising:
    an outer ring that has a cylindrical shape and that has an outer ring raceway surface at one end side and an outer ring raceway surface at another end side, the outer ring raceway surfaces being separately formed on an inner peripheral surface in an axial direction;
    a first inner ring that has a first inner ring raceway surface facing the outer ring raceway surface at the one end side;
    a second inner ring that has a second inner ring raceway surface facing the outer ring raceway surface at the another end side;
    a first retainer that holds a plurality of rolling elements disposed between the outer ring raceway surface at the one end side and the first inner ring raceway surface; and
    a second retainer that holds a plurality of rolling elements disposed between the outer ring raceway surface at the another end side and the second inner ring raceway surface, wherein an outer peripheral surface at one end of the outer ring has a first plane extending in the axial direction, and a groove is formed from the first plane along a radial direction perpendicular to the first plane.

2. The rolling bearing for the turbocharger according to claim 1, wherein the one end is an end disposed at a compressor side of the turbocharger.

3. An anti-rotation mechanism for a turbocharger, the anti-rotation mechanism comprising:
    the rolling bearing for the turbocharger according to claim 1;
    a housing that supports the rolling bearing for the turbocharger; and
    an anti-rotation member that has a second plane to contact the first plane and a protrusion to be fitted into the groove,
    wherein the anti-rotation member is fixed to the housing in a manner that the second plane comes into contact with the first plane and the protrusion is fitted into the groove, and the protrusion extends along the radial direction from the second plane through the first plane.

* * * * *